United States Patent
Rohrmoser et al.

[11] Patent Number: 6,044,972
[45] Date of Patent: Apr. 4, 2000

[54] NAIL MAGAZINE

[75] Inventors: Günter Rohrmoser, Meiningen, Austria; Ulrich Rosenbaum, Buchs, Switzerland

[73] Assignee: Hilti Aktiengesellschaft, Schaan, Liechtenstein

[21] Appl. No.: 09/351,734

[22] Filed: Jul. 12, 1999

[30] Foreign Application Priority Data

Jul. 13, 1998 [DE] Germany ............................ 198 31 378

[51] Int. Cl.$^7$ ................................................. B65D 85/24
[52] U.S. Cl. ............................................. 206/347; 411/443
[58] Field of Search ........................... 206/338, 343–347, 206/820; 411/442, 443

[56] References Cited

U.S. PATENT DOCUMENTS

| | | | |
|---|---|---|---|
| 3,944,067 | 3/1976 | Bakoledis | 206/347 |
| 5,069,340 | 12/1991 | Ernst et al. | 206/347 |
| 5,836,732 | 11/1998 | Gupta et al. | 206/347 |
| 5,865,311 | 2/1999 | Hentges et al. | 206/347 |
| 5,931,622 | 8/1999 | Gupta et al. | 206/345 |

Primary Examiner—Jim Foster
Attorney, Agent, or Firm—Brown & Wood, LLP

[57] ABSTRACT

A nail magazine including a plurality of guide sleeves (2) for receiving each a nail-shaped fastening element (1) and arranged next to each other in a spaced relationship toward each other, forming a row of guide sleeves (2), with each guide sleeve (2) having two end regions ($E_1$, $E_2$) and central region (Z) having a radial extent smaller than a radial extent of both end regions ($E_1$, $E_2$,; and a plurality of connection webs (3) for connecting the guide sleeves (2) with each other, respectively, with each connection web (3) having a region (8) for connecting two adjacent sleeves (2) with each other, each connecting region (8) being spaced from a longitudinal axis of a respective guide sleeve (2) by a radial distance which is greater than a maximal radial extent of the guide sleeve (2), and having a height (H), which is measured in a direction parallel to the longitudinal axis of the guide sleeve (2), smaller than its width (B) measured in a direction transverse to the longitudinal axis of the guide sleeve (2) and transverse to the longitudinal extent of the nail magazine.

8 Claims, 1 Drawing Sheet

NAIL MAGAZINE

BACKGROUND OF THE INVENTION

1. Field of the Invention

The present invention relates to a nail magazine including a plurality of guide sleeves for receiving each a nail-shaped fastening element and arranged next to each other in a spaced relationship toward each other, forming a row of guide sleeves, and a plurality of connection webs for connecting the guide sleeves with each other, respectively, with each connection web having a region for connecting two adjacent sleeves with each other.

2. Description of the Prior Art

Swiss Patent 588,333 discloses a nail magazine for a setting tool having a row of guide sleeves which receive each a nail-shaped fastening element. Each two adjacent guide sleeves are connected by a connection web. The connection web has a connecting region the height of which measured in a direction parallel to the longitudinal axis of a guide sleeve, is larger than the web region width measured in a direction transversed to the guide sleeve longitudinal axis.

The known nail magazine cannot be used with setting tools in which the feed rail is bent in a plane extending a parallel to the longitudinal axis of the guide sleeve. This is because it is in this plane the nail magazine has, because of large height of the connection webs, a very high stiffness.

Accordingly, an object of the present invention is to provide a nail magazine which can be economically produced and is bendable only in a plane, which extends parallel to the guide sleeve longitudinal axis, while having a high stiffness in a plane extending transverse to the guide sleeve longitudinal axis.

SUMMARY OF THE INVENTION

This and other objects of the present invention, which will become apparent hereinafter, are achieved by providing a nail magazine in which each guide sleeve has a central region and two end regions provided on opposite ends of the central region, with the central region having a radial extent smaller than a radial extent of both end regions, and in which each connecting region of a connection web has a height, which is measured in a direction parallel to the longitudinal axis of the guide sleeve, smaller than a width of the connecting region measured in a direction transverse to the longitudinal axis of the guide sleeve and transverse to the longitudinal extent of the nail magazine. A small extent of the connection web in a direction parallel to the guide sleeve longitudinal axis and a large extent of the connection web in a direction transverse to the guide sleeve longitudinal axis impart to the inventive nail magazine a good flexibility in a plane extending parallel to the guide sleeve longitudinal axis and impart a high stiffness in a plane extending transverse to the guide sleeve longitudinal axis.

In order to insure guidance of the nail magazine in a guide rail, the guide sleeve has two, radially widening, end regions provided at opposite ends of the guide sleeve central region. This permits to provide a necessary spacing between adjacent guide sleeves necessary to achieve bending of the nail magazine. The guidance of the nail magazine is effected over the central region which has smaller radial extent in a direction transverse to the guide sleeve longitudinal axis in comparison with the end regions.

In order for the elastic line of the nail magazine to extend through the central region of a guide sleeve during bending of the rail magazine, advantageously, the connection webs are provided in a middle of a longitudinal extent of respective guide sleeves.

In order to achieve a high stiffness of the nail magazine in a plane extending transverse to the guide sleeve longitudinal axis and a good guidance of the nail magazine in a guide rail, preferably, the width of each connection web corresponds at most to the largest extent of the guide sleeve central region in a direction transverse to the guide sleeve longitudinal axis.

Over the dimension of the connection web, its stiffness, in the connecting region, can be influenced in two different planes. Advantageously, the ratio between the width and the height of a connection web amounts to from 1.7:1 to 3.7:1.

In order to impart a high stiffness to each guide sleeve, a connection web of guide sleeves is provided with reinforcing ribs extending from the connection web and into the end regions of the guide sleeve.

In order to insure a pivotal movement of separate guide sleeves relative to each other in a plane parallel to the guide sleeve longitudinal axis, the dimension of the ribs in a direction parallel to the guide sleeve longitudinal axis is, preferably, reduced toward the end region.

In order to insure a reliable, substantially friction-free guidance of separate guide sleeves in a guide tube of a setting tool, advantageously, each of the end regions has at least three elongated ribs extending parallel to the guide sleeve longitudinal axis.

A particularly stable guidance of separate guide sleeves inside a guide tube is advantageously achieved by forming the end regions, at least in the regions of the free ends of the guide sleeve, as circumferential collars.

BRIEF DESCRIPTION OF THE DRAWINGS

The features and objects of the present invention will become more apparent, and the invention itself will be best understood from the following detailed description of the preferred embodiment when read with reference tot he accompanying drawings, wherein.

DETAILED DESCRIPTION OF THE PREFERRED EMBODIMENTS

Figure 1:
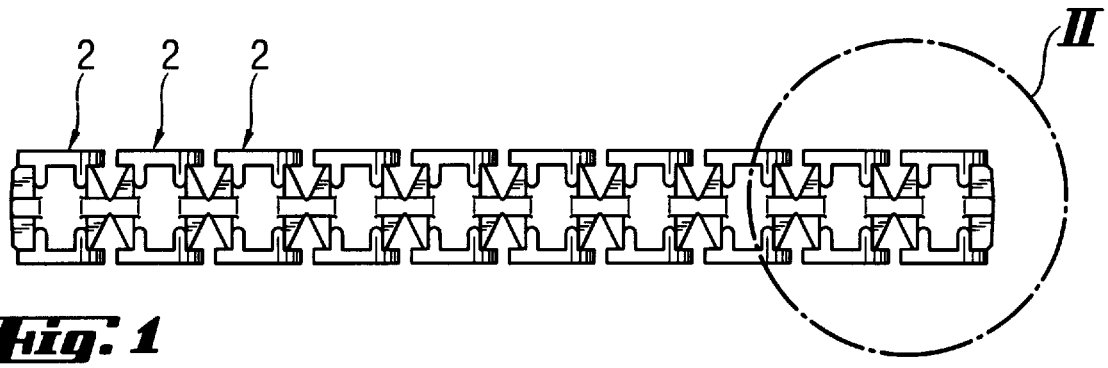
FIG. 1 shows a simplified view of a nail magazine without nail-shaped fastening elements.
Figure 2:
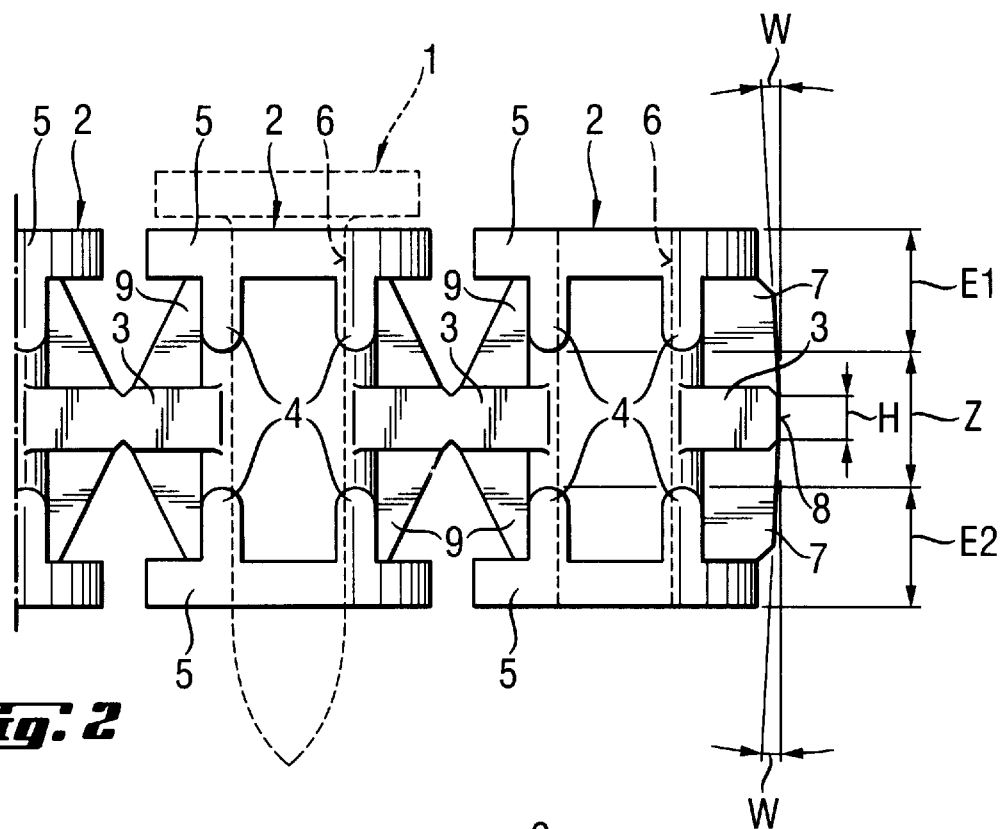
FIG. 2 shows a simplified view of a section II of the nail magazine, which is shown in FIG. 1', at an increased scale.
Figure 3:
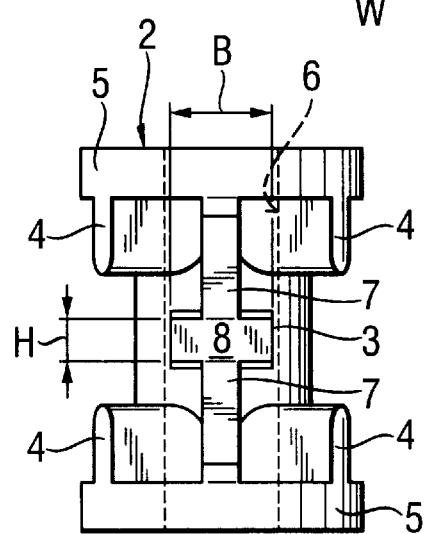
FIG. 3 a view of a free end of the nail magazine, which is shown in FIG. 1, at an increased scale.

A nail magazine according to the present invention, which is shown in FIGS. 1–3, has a plurality of guide sleeves 2 having each a central receiving bore 6 for receiving a nail-shaped fastening element 1. The fastening element 1 is schematically shown in FIG. 2. The guide sleeves 2 are arranged next to each other, forming a row, and are connected with each other. The connection of two adjacent guide sleeves 2 with each other is effected with a connection web 3. The connection web 3 has a connecting region 8, which is located between the adjacent guide sleeves 2. The height H of the connection web 3, which is measured in a direction parallel to the longitudinal axis of a guide sleeve 2 is smaller than its width B measured in a direction transverse to the longitudinal axis of the guide sleeve 2 and transverse to the longitudinal extent of the nail magazine.

A guide sleeve 2 has a central region Z and two radially widening end regions $E_1$ and $E_2$. The radial extent of the end regions $E_1$ and $E_2$ is larger than the radial extent of the central region Z. The central region Z and each of the end regions $E_1$, $E^2$ extend substantially over a third of the entire length of the guide sleeve 2.

The width B of the connection web 3 in its region 8 substantially corresponds to a half of the extent of the central region Z of the guide sleeve measured in a direction transverse to the longitudinal axis of the guide sleeve 2. Both end regions $E_1$, $E_2$ are formed, in the region of free ends of the guide sleeve 2 as a circumferential collar 5. A region of each of the end regions $E_1$, $E_2$, which adjoins the circumferential collar 5, is formed of four elongated ribs 4. The outer contour of the ribs 4 is covered substantially with the outer contour of the collar 5. Each two elongated ribs 4 project from two opposite sides fo the guide sleeve 2 in a direction transverse to the longitudinal axis of the guide sleeve 2 and transverse to the longitudinal extent of the nail magazine.

Each connection web 3 of a guide sleeve 2 is reinforced with ribs 9 which extend from the connection web 3 to the end regions $E_1$, $E_2$ of the guide sleeve 2.

The ribs 7, at a free end of the nail magazine, extend from the connection web 3 fo the collar 5 at an angle W of 4° relative to the longitudinal axis of the guide sleeve 2.

The nail magazine is formed as a plastic injection part, with the complete guide sleeves 2 being connected with each other by connection webs 3, respectively. The region 8 of a connection web 3 serves, upon receiving of a fastening element 1, as a break-off location.

Though the present invention was shown and described with references to the preferred embodiment, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A nail magazine, comprising a plurality of guide sleeves (2) for receiving each a nail-shaped fastening element (1) and arranged next to each other in a spaced relationship toward each other, forming a row of guide sleeves (2) having a central region (Z) and two end regions ($E_1$, $E_2$) provided on opposite ends of the central region (Z), the central region (Z) having a radial extent smaller than a radial extent of both end regions ($E_1$, $E_2$); and a plurality of connection webs (3) for connecting the guide sleeves (2) with each other, respectively, each connection web (3) having a region (8) for connecting two adjacent sleeves (2) with each other, each connecting region (8) being spaced from a longitudinal axis of a respective guide sleeve (2) by a radial distance which is greater than a maximal radial extent of the guide sleeve (2), and each connecting region (8) having a height (H), which is measured in a direction parallel to the longitudinal axis of the guide sleeve (2), smaller than a width (B) theroef measured in a direction transverse to the longitudinal axis of the guide sleeve (2) and transverse to the longitudinal extent of the nail magazine.

2. A nail magazine according to claim 1, wherein the connecting region (8) is provided in a middle of a longitudinal extent of respective guide sleeves (2).

3. A nail magazine according to claim 1, wherein the width (B) of the connecting region (8) corresponds maximum to a largest extent of the central region (Z) of a guide sleeve (2) measured in a direction transverse to the longitudinal axis of the guide sleeve (2).

4. A nail magazine according to claim 1, wherein a ratio between the width (B) and the height (H) of the connecting region (8) of a connection web (3) amounts to from 1.7:1 to 3.7:1.

5. A nail magazine according to claim 1, wherein each connection web (3) has reinforcing ribs (7, 9) extending from the connection web (3) to the end regions ($E_1$, $E_2$) of a guide sleeve (2).

6. A nail magazine according to claim 5, wherein a dimension of the ribs (7, 9) measured parallel to a longitudinal extent of the nail magazine is reduced toward the end regions ($E_1$, $E_2$) of the guide sleeves (2).

7. A nail magazine according to claim 1, wherein each of the two end regions ($E_1$, $E_2$) of each guide sleeve (2) has at least three elongate ribs (4) extending parallel to the longitudinal axis of a guide sleeve.

8. A nail magazine according to claim 1, wherein the end regions ($E_1$, $E_2$) are formed, at least at free ends of a guide sleeve (2) as circumferential collars (5), respectively.

* * * * *

UNITED STATES PATENT AND TRADEMARK OFFICE
CERTIFICATE OF CORRECTION

PATENT NO.    : 6,044,972

DATED         : April 4, 2000

INVENTOR(S)   : Günter Rohrmoser, et al

It is certified that error appears in the above-identified patent and that said Letters Patent is hereby corrected as shown below:

On the title page, item
{75} Inventors: Günter Rohrmoser, Meiningen, Austria;
                Ulrich Rosenbaum, Wangs, Switzerland Signed and Sealed this Thirteenth Day of February, 2001

Attest:

NICHOLAS P. GODICI

Attesting Officer    Acting Director of the United States Patent and Trademark Office